W. C. MAUER.
BEET DIGGER AND TOPPER.
APPLICATION FILED OCT. 17, 1908.
938,263.
Patented Oct. 26, 1909.
4 SHEETS—SHEET 1.
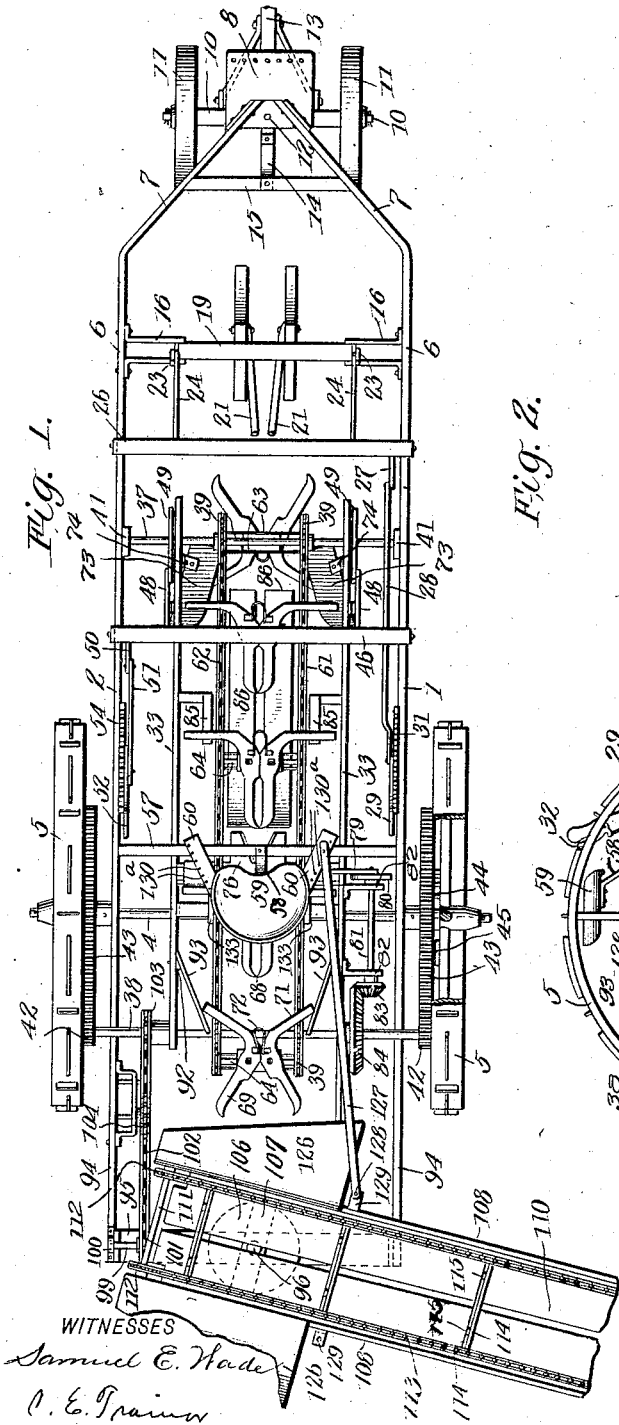
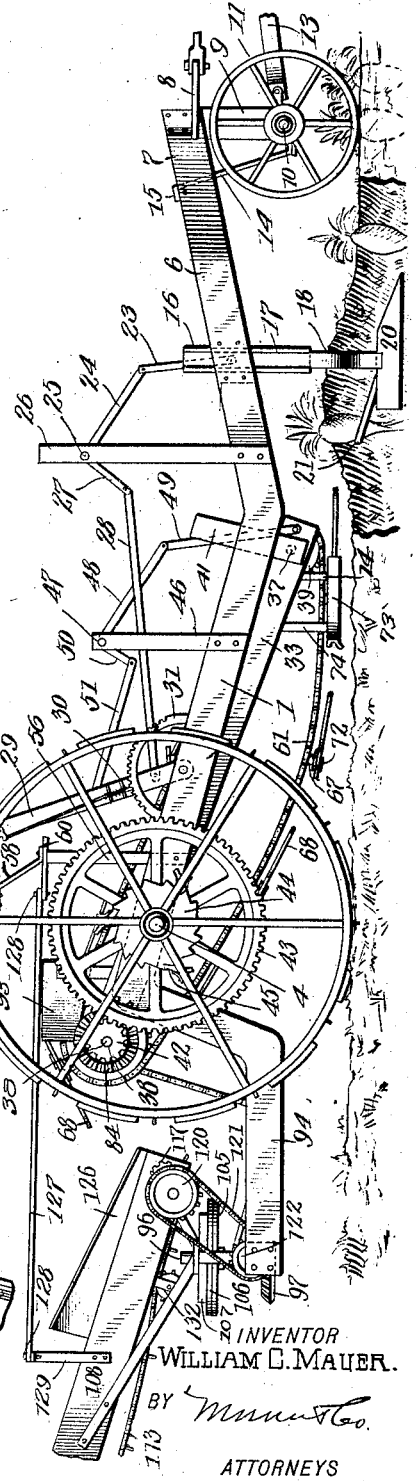
WITNESSES
Samuel E. Wade
C. E. Trainor
INVENTOR
WILLIAM C. MAUER.
BY
ATTORNEYS

W. C. MAUER.
BEET DIGGER AND TOPPER.
APPLICATION FILED OCT. 17, 1908.

938,263.

Patented Oct. 26, 1909.
4 SHEETS—SHEET 2.

WITNESSES
Samuel E. Wade
C. E. Trainor

INVENTOR
WILLIAM C. MAUER.
BY Munn & Co.
ATTORNEYS

W. C. MAUER.
BEET DIGGER AND TOPPER.
APPLICATION FILED OCT. 17, 1908.

938,263.

Patented Oct. 26, 1909.
4 SHEETS—SHEET 3.

WITNESSES
Samuel E. Wade
C. E. Tramor

INVENTOR
WILLIAM C. MAUER.
BY
ATTORNEYS

W. C. MAUER.
BEET DIGGER AND TOPPER.
APPLICATION FILED OCT. 17, 1908.

938,263.

Patented Oct. 26, 1909.
4 SHEETS—SHEET 4.

WITNESSES
Samuel E. Wade
C. E. Trainor

INVENTOR
WILLIAM C. MAUER.
BY Munn & Co.
ATTORNEYS

UNITED STATES PATENT OFFICE.

WILLIAM CUCIL MAUER, OF GREELEY, COLORADO.

BEET DIGGER AND TOPPER.

938,263.

Specification of Letters Patent.  Patented Oct. 26, 1909.

Application filed October 17, 1908.  Serial No. 458,176.

*To all whom it may concern:*

Be it known that I, WILLIAM C. MAUER, a citizen of the United States, and a resident of Greeley, in the county of Weld and State of Colorado, have invented certain new and useful Improvements in Beet Diggers and Toppers, of which the following is a specification.

My invention is an improvement in beet diggers and toppers, and consists in certain novel constructions and combinations of parts hereinafter described and claimed.

Figure 3:
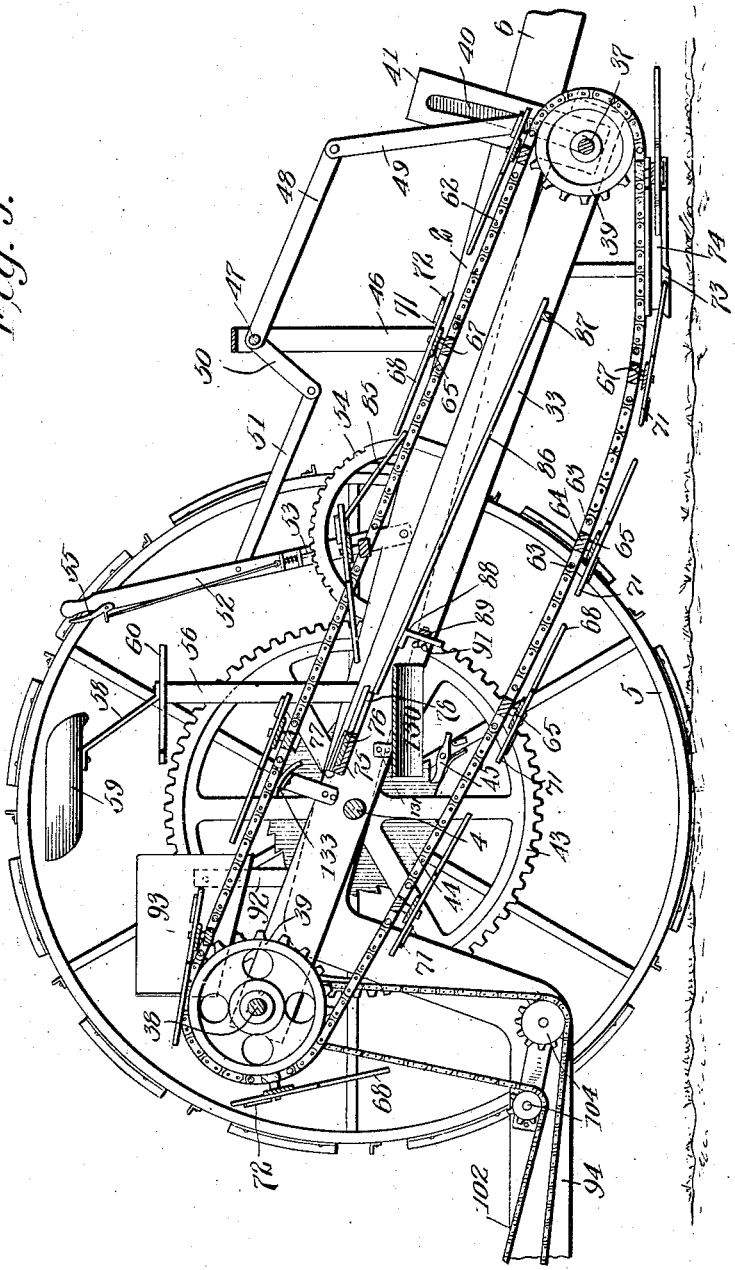
Figure 4:
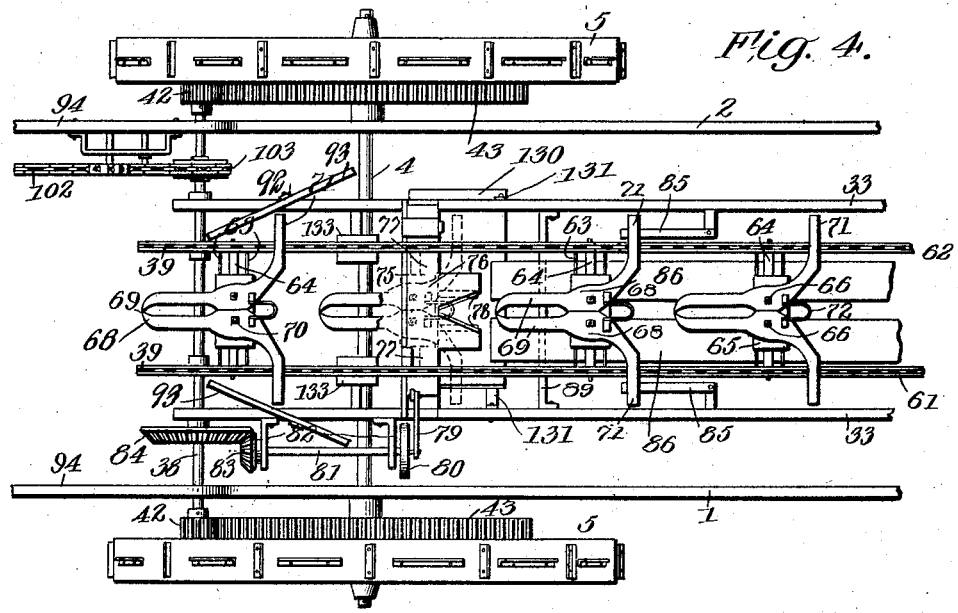
Figure 5:
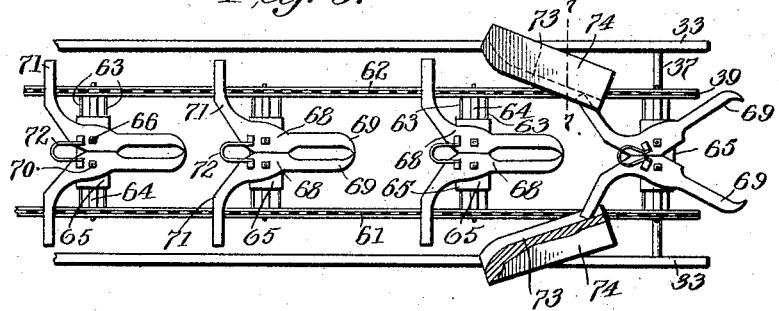
Figure 6:
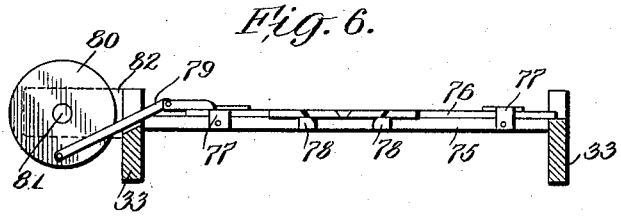
Figure 7:
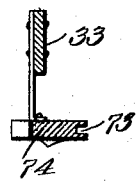
Figure 8:
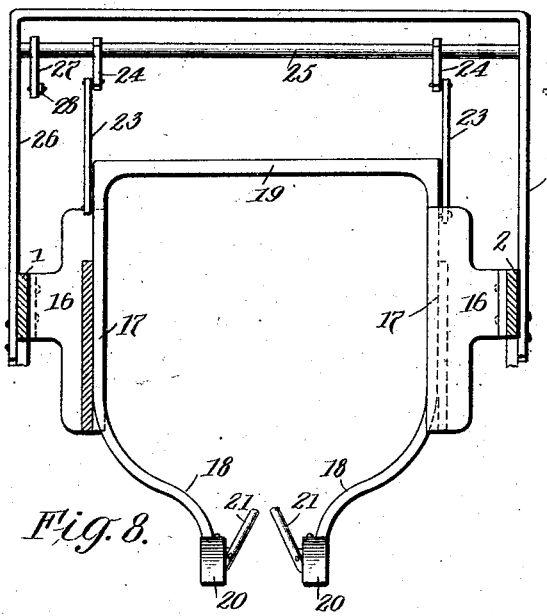
Figure 9:
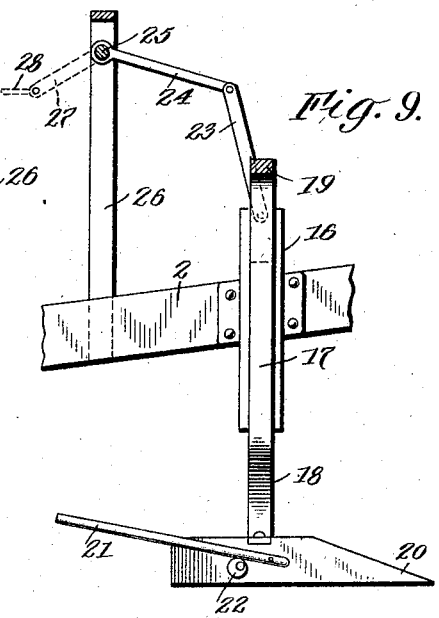
Figure 10:
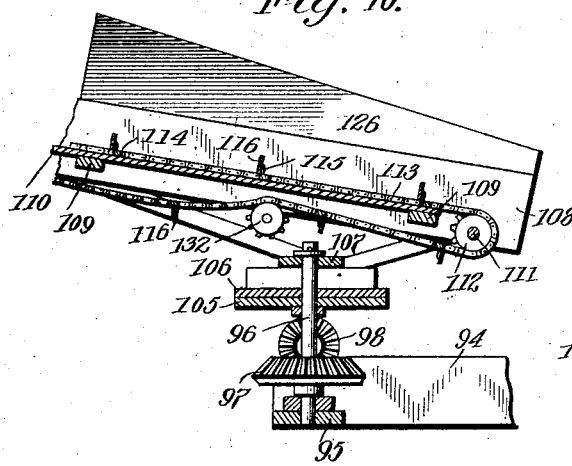
Figure 11:
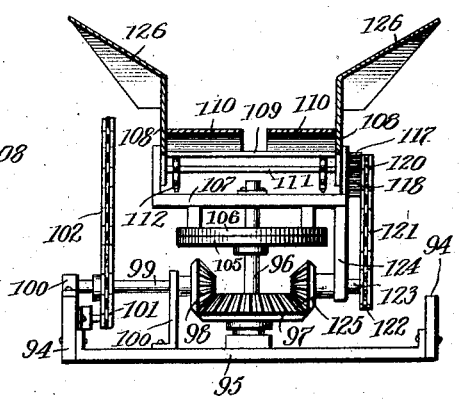

Referring to the drawings forming a part hereof Figure 1 is a plan view of the improvement. Fig. 2 is a side view. Fig. 3 is a central longitudinal section of a portion of the machine. Fig. 4 is a partial plan view with parts of the machine removed. Fig. 5 is a bottom plan view of a portion of the carrier. Fig. 6 is a transverse section of the carrier on the line of the cutter. Fig. 7 is a section on the line 7—7 of Fig. 5. Fig. 8 is a transverse section on the line of the diggers. Fig. 9 is a side view of the diggers.
Fig. 10 is a detail sectional view of a portion of the conveyer, and Fig. 11 is an end view.

The present embodiment of the invention comprises a frame consisting of side plates 1, 2, provided near their rear ends with bearings, in which is journaled the power shaft 4, having journaled on the ends thereof, the supporting wheels 5.

Connected to the front ends of the side plates 1 and 2 are extension plates 6, converging at their front ends as at 7, and connected by a clevis 8. The converging ends are supported by a bolster 9, which rests upon an axle 10, provided on its ends with wheels 11, the bolster being connected to the axle by a king-bolt 12. A tongue 13 is connected with the axle 10, and a brace 14 extends from the rear of the axle upwardly engaging a cross bar 15 connecting the converging ends of the extension plates. Vertical guide ways 16 are arranged on the extension plates, and bars 17 are slidable in the guide ways, the lower ends of the bars being curved inwardly as at 18, and the upper ends are connected by a cross bar 19. The lower ends of the bars are provided with diggers 20, each of which has adjustably secured thereto, a rearwardly projecting fender 21, the fenders being bolted to the diggers and supported by a block 22 arranged at the rear of the pivotal connection and rotatably connected with the digger. The block is eccentrically pivoted and it will be evident that by turning the same the fenders will be raised or lowered.

A link 23 is connected with each of the bars 17, by one end, the other end being pivoted to forwardly projecting arms 24, on a rock shaft 25 journaled in standards 26 connected with the extension plates, the said shaft being provided with another arm 27 connected by a link 28 with a lever 29 pivoted on the side plate 1, the said lever being provided with a spring actuated tooth 30, engaging a toothed quadrant 31 secured to the frame, the tooth being manipulated by a grip 32 pivoted on the lever. It will be evident from the description, that by manipulating the lever 29, the diggers may be raised and lowered in unison to provide for digging beets, in ridges of different depths.

Between the side plates 1 and 2, is arranged an auxiliary frame consisting of side plates 33, the said plates being provided with bearings journaled on the power shaft 4, and with other bearings at each end, in which are journaled shafts 37, 38, each of the shafts being provided within the frame and adjacent to the side plates with sprocket wheels 39, over which passes a carrier to be presently described. The ends of the shaft 37 are extended beyond the auxiliary frame, and engage arc-shaped slots 40 in plates 41, secured to the side plates 1 and 2, and the ends of the shaft 38 are extended beyond the auxiliary frame, and beyond the side plates 1 and 2, and are provided with pinions 42 meshing with gear wheels 43 journaled on the power shaft 4 the said gear wheels being provided on their outer faces with ratchet wheels 44, which are normally in engagement with spring pressed pawls 45 connected with the wheels 5. It will be understood that the power wheels are connected to the gear wheels by the pawl and ratchet, which connection constrains the gear wheels to rotate with the power wheels when the said wheels move in a forward direction, but releases them when they move in a rearward direction.

Near the front end of the side plates 1 and 2 are arranged standards 46, in which is journaled a rock shaft 47 having forwardly projecting arms 48, connected by links 49 with the front ends of the side plates of the auxiliary frame. The shaft is provided with another arm 50, connected by a link 51, with a lever 52 journaled on a side plate 2 and having a spring actuated tooth 53 engaging a toothed quadrant 54 secured to the side plate 2, the tooth being operated by a grip 55 pivoted to the lever. It will be evident that by manipulating the lever the front end of the auxiliary frame may be raised and lowered to correspond with the position of the digger.

At the rear of the standards 46, are arranged other standards 56 connected by a cross bar 57, with one end of which is secured a spring plate 58 having connected with the other end a seat 59, and foot rests 60 are secured to the cross bar adjacent to the seat.

The carrier before mentioned comprises two sprocket chains 61 and 62 connected at spaced intervals by pairs of spaced rods 63 and between each pair of rods is arranged a cross bar 64 also connecting the chains. A plate 65 is connected with each cross bar by means of bolts 66, an arbor 67 encircling each bolt between the plate and the bar. A pair of gripping arms 68 are pivoted to each plate, comprising a gripping jaw 69, on one side of the pivot 70, and an outwardly curved cam arm 71 on the other side of the pivot. A spring 72 is arranged between each pair of arms normally retaining them in the position shown in Fig. 4, with the gripping jaws in spaced relation. The jaws are normally spaced apart from each other, a distance corresponding to the smallest size beet, which it is desired to top, all beets below such size being rejected by the jaws. Adjacent to the lower run of the carrier, and near the front end of the auxiliary frame are arranged cams 73, supported by brackets 74 depending from the side plates of the auxiliary frame, which are adapted to engage the cam arms 71 to open the jaws as they reach the front end of the auxiliary frame, whereby to place them in position for grasping the beet.

Near the upper end of the auxiliary frame is arranged a cross bar 75 between the side plates, and a sickle blade 76 is mounted for reciprocating movement in guide ways 77 on the cross bar, the cross bar being provided with guard teeth 78. A link 79 is pivoted by one end to one end of the sickle blade, the other end being pivoted to a disk 80 on a shaft 81, journaled in brackets 82 connected with the auxiliary frame, and arranged on the outer face of the side plate. The rear end of the shaft is provided with a bevel gear 83, meshing with a bevel gear 84 on the shaft 38 before mentioned. In front of the sickle blade 76 a guide bar 85 is connected with each of the side plates of the auxiliary frame, the said guide bar being adapted to engage the cam arms of the gripping device whereby to tilt the gripping jaws slightly downwardly to bring the beet in proper position for topping. A pair of spaced boards 86 are arranged between the side members of the auxiliary frame adjacent to the guide bars, and between the runs of the carrier, the said boards being supported at one end by a cross bar 87 and at the other end on blocks 88 which are adjustably mounted on a second cross bar 89, the blocks being slotted, and connected to the cross bar by bolts 91 which traverse the slots. The boards are spaced apart a distance less than the thickness of the smallest beet which will be grasped by the gripping jaws, whereby to permit the top of the beet to extend between the boards, but to prevent the crown of the beet passing therebetween, thus bringing the crown in proper position to be topped by the sickle blade. The said blade is provided with two cutting fingers which are inclined away from each other in the usual manner, and are adapted to receive the top of the beet therebetween, so that when the sickle blade is moved in either direction a finger will be brought in contact with the top. By adjusting the blocks 88 with respect to the cross bar 89, the boards may be raised or lowered to bring the beet in the proper position for topping.

Near the rear end of the auxiliary frame are arranged brackets 92, with each of which is connected a cam plate 93, arranged to engage the cam arms to open the gripping jaws and to release the beets which are received by a conveyer to be described.

Brackets 94 are connected with the rear ends of the side plates 1 and 2, the free ends of the brackets being connected by a cross bar 95, and at the center of the cross bar is journaled a vertical stud shaft 96, having secured thereto a bevel gear wheel 97 with which meshes a bevel pinion 98 on the end of a horizontal stud shaft 99, journaled in bearings 100 on the cross bar and the adjacent bracket. The shaft is provided between the bearings with a sprocket wheel 101, engaged by a sprocket chain 102, passing over a sprocket wheel 103 on the shaft 38, and a pair of idlers 104 are journaled on the bracket for engaging the respective runs of the chain as shown in Fig. 3, whereby to retain said runs from interfering with the movements of the carrier.

Near the upper end of the stud shaft 96, is secured a disk 105, superimposed upon which is another disk 106, having secured to the upper face thereof a cross plate 107, upon the ends of which are supported the side plates 108 of the conveyer frame, the said plates being connected at suitable intervals by cross bars 109, upon which are secured boards 110, spaced apart from each other to form a support up which the beets move.

At each end of the side plates 108 is journaled a shaft 111, provided adjacent to each plate with a sprocket wheel 112, and the said wheels are engaged by sprocket chains 113, which chains are connected at suitable intervals by cross bars 114, each of which is provided with upwardly projecting lugs 115 having connected therewith, a plate 116 for engaging the beets and moving them along the boards. The outer end of the shaft 111 is provided with a pinion 117, meshing with a gear wheel 118 on a stud shaft, connected with the adjacent side plate, and provided with a sprocket wheel 120, connected by a sprocket chain 121, with a sprocket wheel 122, on a stud shaft 123 journaled in a bracket 124 depending from the cross plate 107, the inner end of the shaft being provided with a bevel pinion 125, meshing with the bevel gear 97 before mentioned whereby to move the conveyer.

An apron 126 projects outwardly from each side plate 108 adjacent to the rear end of the carrier provided with gripping devices, the said aprons being adapted to receive and deflect the delivered beets on to the conveyer just described. The said conveyer is rotatable around the vertical stud shaft, the two disks acting as a turn table, and is secured in its adjusted position by means of a link 127 provided at each end with a pin 128 one of which is adapted to engage a perforation in a bracket 129, one of which is secured to each side plate of the carrier frame, and the other with one of a series of perforations 130ª in the foot plates before mentioned.

It will be observed that the device is especially adapted for digging and topping sugar beets, which are generally planted in elevated ridges, and at spaced distances apart. Beets below a certain size are culled or rejected and the remainder must be topped at the crown.

In operation the machine is drawn through the field with the wheels on each side of the ridge, and with the diggers adjusted a proper distance to enter the ridge and elevate the beets. The front end of the carrier is adjusted to a position such that the gripping devices will grasp the beet as it leaves the fenders. The relation between the gear wheels 43 on the power shaft and the pinions 42 on the shaft 38 corresponds to the distance between the individual beets in the row, the relation being such that the travel of the gripping devices will bring one device into position for grasping each beet, regardless of the speed of the machine. As the gripping device with the beet in place reaches the upper run of the carrier it will be evident that the beet will be reversed bringing the top downward, and as the beet passes up the auxiliary frame the top will encounter the sickle blade and be severed from the beet. As the beet reaches the rear of the carrier the gripping device is released, and the beet is delivered on to the conveyer, which delivers it to one side of the machine. By adjusting the angle of inclination of the conveyer to the machine, the beets from the several rows may be delivered in a continuous pile, and in position for loading. This delivery may be upon either side of the machine.

It will be observed from an inspection of Figs. 1, 4 and 5 that the gripping jaws have hooked ends the bills of the hooks contacting when the jaws are in normal position, the said hooked ends serving to retain the gripping part of the jaws in spaced relation with respect to each other. Idlers 132 are arranged beneath the conveyer from which idlers the sprocket chains pass for the purpose of retaining said chains from interference with the parts therebelow. Guides 133 are provided for the sprocket chains of the carrier at the rear of the cutting device, for lifting said chains above the parts connected with the axle 4.

A board 130 is supported by a bracket 131 secured to the frame and is arranged below the cutter bar, for the purpose of deflecting the tops to one side of the machine.

I claim:

1. A beet digger and topper, comprising a main frame, a shaft journaled transversely of the rear end of the frame, wheels on the shaft, an auxiliary frame within the main frame, the rear end of said frame being journaled on the shaft, means in connection with the front end of the auxiliary frame for raising and lowering the same, an extension frame at the front of the main frame, diggers on the extension frame, means for raising and lowering the diggers, a truck upon which the extension frame rests, and in pivotal connection with the said frame, a carrier on the auxiliary frame, said carrier consisting of spaced chains connected at spaced intervals by pairs of rods, a bar arranged between each pair of rods, a plate connected with the outer face of the bar and spaced apart therefrom, a pair of gripping arms pivoted to each plate, each arm comprising a gripping jaw, for coöperating with the jaw of the other arm of the pair, and an outwardly curved cam arm, a spring normally tending to force the jaws toward each other, cams near the lower end of the carrier, for engaging the arms to open the jaws, whereby to permit them to grasp the beet, a cutting device below the upper run of the carrier for topping the beet, cams at the rear of the carrier for engaging the arms to release the beet, a conveyer for receiving the beet and delivering it to the side of the machine, a connection between the wheels and the carrier for driving the same, and a connection between the wheels and the conveyer for operating said conveyer.

2. A beet digger and topper, comprising a wheeled frame, diggers at the front of the frame, an auxiliary frame adjustably mounted within the main frame, and provided at each end with sprocket wheels, a carrier supported by the sprocket wheels, and consisting of spaced chains connected at spaced intervals by pairs of rods, a bar arranged between each pair of rods, a plate connected with the outer face of the bar and spaced apart therefrom, a pair of gripping arms pivoted to each plate, each arm comprising a gripping jaw for coöperating with the jaw of the other arm of the pair, and an outwardly curved cam arm, a spring normally tending to force the jaws toward each other, cams near the lower end of the carrier, for engaging the arms to open the jaws, whereby to permit them to grasp the beet, a cutting device below the upper run of the carrier, for topping the beet, cams at the rear of the carrier for engaging the arms to release the beet, a conveyer for receiving the beet and delivering it to the side of the machine, a connection between the wheels and the carrier for driving the same, and a connection between the wheels and the conveyer for operating said conveyer.

3. In a beet digger and topper, means for digging the beets, and means behind the digging means for receiving the beets therefrom, said means comprising an adjustable frame provided at each end with sprocket wheels, chains on the wheels, and spaced apart from each other, said chains being connected at spaced intervals by pairs of rods, a bar arranged between each pair of rods, a plate connected with the outer face of the bar and spaced apart therefrom, a pair of gripping arms pivoted to each plate, each arm comprising a gripping jaw for coöperating with the jaw of the other arm of the pair, and an outwardly curved cam arm, a spring normally tending to force the jaws toward each other, means for retaining the engaging faces of the jaws in spaced relation, means near the digging device for opening the jaws to receive a beet, means below the upper run of the chains for topping the beet while held by the jaws, and means at the rear of the carrier for engaging the arms to release the jaws.

4. In a beet digger and topper, means for digging the beets, an endless carrier for receiving the beets from the digging means, said carrier being provided with spaced gripping jaws, means on the lower run of the carrier for opening the jaws to receive the beets from the digger, a topping device below the upper run of the carrier for topping the beets, and means at the rear of the carrier for opening the jaws to release the beets.

5. In a beet topper and digger, means for topping the beets comprising a transversely movable sickle for topping the beets and a plurality of gripping devices for seizing the beets and moving them to the sickle, said devices comprising each a pair of gripping arms having gripping jaws spaced apart from each other and cam arms, means for engaging the arms for opening the jaws for receiving the beets and means for engaging the arms to open the jaws to release the beets.

6. In a beet topper and digger, a carrier for the beets comprising spaced sprocket chains connected at spaced intervals, pairs of gripping arms pivoted on each connection between the chains, a spring acting to move the arms together, means at one end of the carrier for opening the arms to receive the beets, means at the other end for moving the arms to release the beets and a topping device intermediate the ends of the carrier.

7. In a beet topper and digger, a carrier for the beets comprising spaced sprocket chains connected at spaced intervals, a pair of gripping arms pivoted on each connection between the chains, a spring acting to move the arms together, means at one end of the carrier for opening the jaws to receive the beets, a topper intermediate the length of the carrier, means for tilting the gripping arms to bring the beets into proper position for engagement by the topper, and means at the opposite end of the carrier for moving the arms to release the beets.

8. In a beet topper and digger, a carrier for the beet comprising spaced sprocket chains connected at spaced intervals, pairs of gripping jaws pivoted on each connection between the chains, a spring acting to move the jaws together, means at one end of the carrier for opening the jaws to receive the beets and means at the other end for opening the jaws to release the beets.

WILLIAM CUCIL MAUER.

Witnesses:
CHARLES FRANCIS TEED,
ALBERT JOHN CONELON.